(12) United States Patent
Crane et al.

(10) Patent No.: US 8,689,130 B1
(45) Date of Patent: *Apr. 1, 2014

(54) TEXT FIELD INPUT

(71) Applicant: Amazon Technologies, Inc., Reno, NV (US)

(72) Inventors: Michael Richard Crane, Seattle, WA (US); Iain Alasdair Kennedy, Seattle, WA (US); Vinay P. Vaidya, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/841,262

(22) Filed: Mar. 15, 2013

Related U.S. Application Data

(63) Continuation of application No. 12/544,867, filed on Aug. 20, 2009, now Pat. No. 8,423,899.

(51) Int. Cl.
*G06F 3/048* (2013.01)

(52) U.S. Cl.
USPC .......................................... 715/780; 715/765

(58) Field of Classification Search
USPC .......................... 715/733, 738, 764, 765, 780
See application file for complete search history.

(56) References Cited

U.S. PATENT DOCUMENTS

| 7,788,594 B1 | 8/2010 | Tevanian, Jr. |
| 2008/0052226 A1 | 2/2008 | Agarwal et al. |
| 2008/0229230 A1 | 9/2008 | Grigoriev et al. |

OTHER PUBLICATIONS

U.S. Appl. No. 12/544,867, filed Aug. 20, 2009, Michael Richard Crane et al., "Text Field Input".
Office action for U.S. Appl. No. 12/544,867, Nov. 2, 2012, Crane et al., "Text Field Input", 5 pages.
Non-Final Office Action for U.S. Appl. No. 12/544,867, mailed on May 24, 2012, Michael Richard Crane et al., "Text Field Input", 5 pages.

*Primary Examiner* — Xiomar L Bautista
(74) *Attorney, Agent, or Firm* — Lee & Hayes, PLLC (57) ABSTRACT

Techniques for providing a single text field and multiple different types of user input modes for inputting information into the single text field are described herein. In some instances, a user may enter a first portion of text into the text field in a first user input mode before inputting a second portion of text into the field in a second user input mode. The techniques may enforce a first set of rules associated with the first user input mode while the user enters the first portion of text. The techniques may then enforce a second, different set of rules associated with the second user input mode while the user enters the second portion of text. As such, the techniques enable a user to provide two or more different pieces of information into a single text field.

20 Claims, 9 Drawing Sheets

TEXT FIELD INPUT

RELATED APPLICATIONS

This application is a continuation of U.S. patent application Ser. No. 12/544,867 filed Aug. 20, 2009, entitled TEXT FIELD INPUT, which relates to U.S. Provisional Application No. 60/823,611, filed on Aug. 25, 2006, and U.S. patent application Ser. No. 11/548,111, filed on Oct. 10, 2006, both entitled UTILIZING PHRASE TOKENS IN TRANSACTIONS and the entire contents of each are incorporated herein by reference in their entirety for all purposes.

BACKGROUND

Text fields enable users employing computing devices to input a myriad of different information into electronic forms. For example, if a user browses a site of a service provider, the site may include an electronic from that includes multiple different text fields intended to acquire different pieces of information from the user. For instance, if the site desires to receive an address of the user, then a first text field may specify that the user should type his or her street number into the text field. The site may also include a second text field, which may specify that the user should enter his or her city of residence into the second text field. In addition, the site may include third and fourth text fields that respectively request that the user enter his or her state and zip code of residence. If the site desires any further information from the user (e.g., user name, password, payment information, etc.), the electronic form of the site may include yet more text fields. No matter the number of fields, after entering his or her information, the user may choose to submit the information to the service provider by selecting an icon or otherwise causing submittal of the entered information.

While text fields prove effective at enabling users to input information, the presence of multiple, different text fields results in an electronic form that is sometimes large and cumbersome to complete.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed, in part, to techniques for providing a single text field and multiple different types of user input modes for inputting information into the single text field. In some instances, a user may enter a first portion of text into the text field in a first user input mode before inputting a second portion of text into the field in a second user input mode. The techniques may enforce a first set of rules associated with the first user input mode while the user enters the first portion of text. The techniques may then enforce a second, different set of rules associated with the second user input mode while the user enters the second portion of text. For instance, the rules may restrict the set and/or number of characters that may be entered within the text field during a particular user input mode. The rules may also specify display characteristics of the first portion of text, while specifying different display characteristics of the second portion of text in a different manner. As such, the techniques enable a user to provide two or more different pieces of information into a single text field. By doing so, the techniques may reduce the number of text fields needed to acquire multiple pieces of information and, as such, may lessen the size and complexity of an electronic form.

In one example, a user may navigate to a site for the purpose of engaging in a transaction with a content provider that hosts the site. For instance, the user may wish to sign in to his or her account, purchase an item offered for consumption, or engage in any other transaction. To do so, the site may include a text field in which a user may enter an identifier (e.g., user name or the like) as well as a password associated with the identifier. While in a first user input mode, the user may provide an identifier associated with the user into the text field. This first user input mode may be associated with a set of rules, which may restrict a set of characters that the text field will accept. Additionally or alternatively, the rules may alter or otherwise define display characteristics of the entered text, and/or may include any other rules.

For instance, the first set of rules may restrict entry into the text field to those characters that make up proper identifiers for the site. That is, if the site allows users to create identifiers that comprise letters but not numerals, then the set of rules associated with the first user input mode may restrict entry to letters. Therefore, when the user provides an input specifying one or more letters, the techniques may display the letters (or other characters) in the text field. If, however, the user provides an input specifying one or more numerals, the techniques may refrain from displaying the numerals (and/or other characters) in the text field. Instead, the techniques may simply refrain from displaying anything within the text field for inputs specifying characters outside of the characters specified by the first set of rules.

In addition or in the alternative, the first set of rules may specify display characteristics for text entered within text field while in the first user input mode. In the instant example, the first set of rules may specify that the entered text should be displayed in the text field. That is, because the user enters his or her identifier (e.g., a user name of the like) while in the first user input mode, the first set of rules may specify that this non-sensitive information should be displayed within the text field. Therefore, when a user enters her identifier as, for example "Grace Smith," the words "Grace Smith" will appear within the text field. In other instances and as discussed below, however, the techniques may mask the received input for sensitive information.

After entry of the identifier but while the user still provides input within the single text field, the techniques may transition to a second user input mode, possibly without receiving an explicit request from the user to do so. That is, the techniques may transition to the second user input mode as the user types within the same text field. In this example, the user may input a password or Personal Identification Number (PIN) into the text field while in the second user input mode. Here, the second user input mode may restrict entry of characters into the text field to a set of characters that differs from the set of characters associated with the first user input mode. For instance, the second user input mode may allow the user to provide numerals but not letters into the text field. In some instances, the set of characters that may be entered while in the first user mode (e.g., letters) may be mutually exclusive from the set of characters that may be entered while in the second user input mode (e.g., numerals). In addition, the second user input mode may limit the number of characters that the user may enter into the text field.

The second user input mode may also specify or alter the display characteristics of input received during the second user input mode. For instances, because a password or PIN comprises sensitive information that the user likely wishes to keep secret, the second user input mode may mask input received in this mode. That is, if the user enters a PIN of "4743", the techniques may simply display the following: "****" within the text field. Of course, the techniques may mask this PIN by displaying any other characters or by refraining from causing a display at all. In this same example, the second user input mode may limit the user to entry of four characters. That is, since the user enters a PIN in the second user mode, the second user mode may only allow the user to provide four numbers or some other amount of numbers, depending on the length of the expected PIN.

In the instant example, once the user provides this PIN into the text field, the contents of the text field will display the following string: "Grace Smith ****". However, the actual contents of the text field will be the following string: "Grace Smith 4444". At this point, the user may submit the entered string to the site, which may complete (or decline) the transaction with the user.

As this example illustrates, the techniques described herein may enable a user to provide multiple different pieces of information within a single text field. To do so, the techniques may provide multiple different user input modes, each of which may restrict entry of characters to a specified set of characters and/or may specify or alter display characteristics of the received input. In some instances, a text field comprises a text box, while in other instance a text field may comprise any field in which a user may provide input in a free-form manner.

In one non-limiting example described above, these techniques allowed the user to enter an identifier of the user and a password or PIN associated with the identifier into a single text field in a secure manner. More specifically, the techniques caused display of the non-secret information (the identifier), while refraining from causing display of the secret information (the PIN). While the following discussion describes this and multiple other examples, the described techniques may be applicable in many other contexts.

The discussion begins with a section entitled "Illustrative Architecture," which describes one non-limiting environment in which a content provider may provide a text field and functionality that provides multiple different user input modes while a user provides input into the text field. A section entitled "Illustrative User Interfaces" follows. This section depicts and describes examples of user interfaces (UIs) that may be served to and rendered at the devices of the user of FIG. 1. Next, a section entitled "Illustrative Flow Diagrams" follows and describes two example flow diagrams of a user providing multiple different pieces of information in a single text field. The discussion then concludes with a section entitled "Illustrative Processes" and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 1:
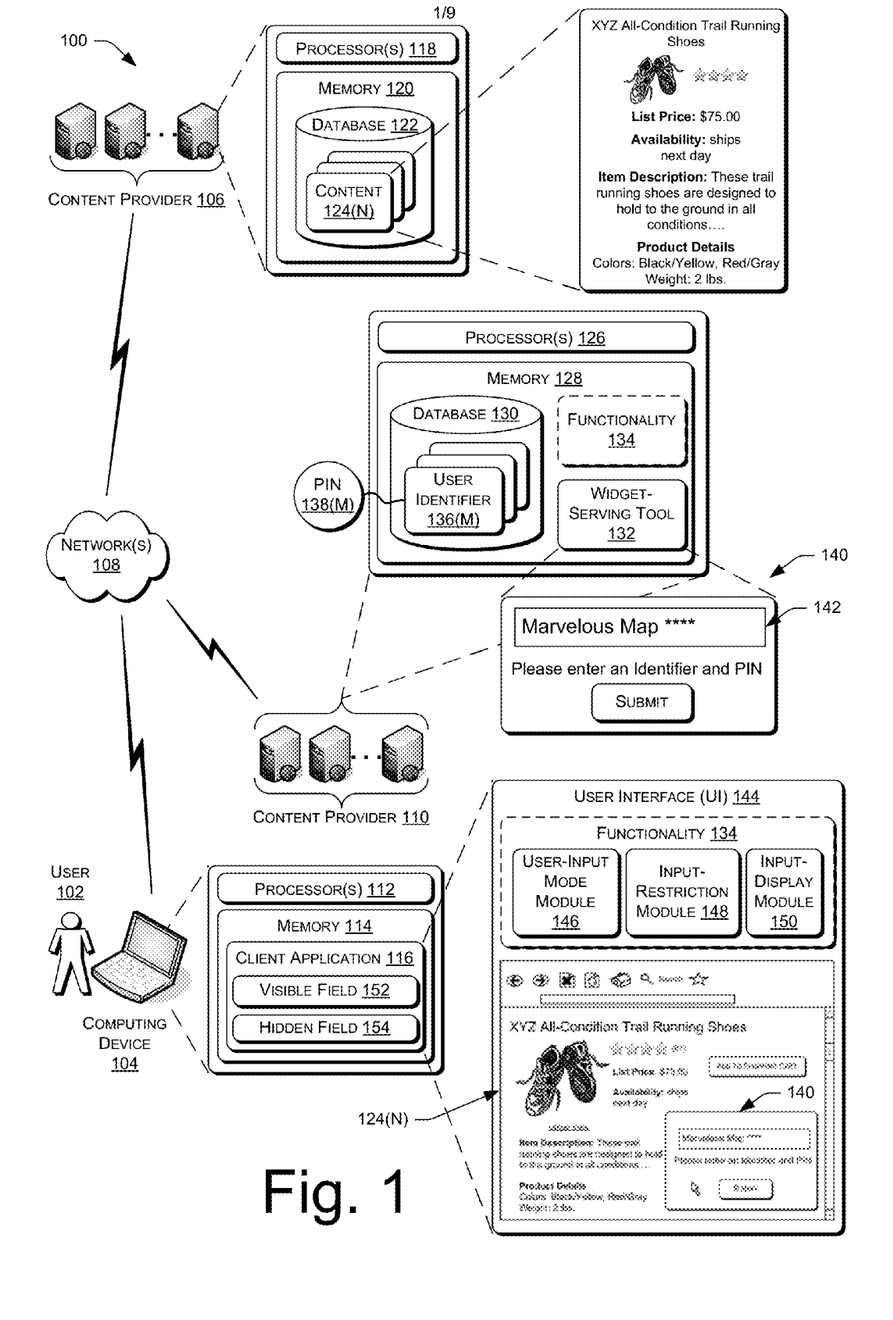
FIG. 1 illustrates an example architecture that includes a user operating a computing device for the purpose of requesting content from a content provider. In addition to receiving the requested content, the computing device of the user receives a widget that includes a single text field that enables entry of multiple different pieces of information in respective different user input modes.

FIG. 1 illustrates an example architecture 100 that may implement techniques for providing multiple different user input modes while a user provides input into a single text field. Each of the multiple different user input modes may enforce a particular set of rules associated with the mode. These rules may restrict entry into the text field to a particular set of characters, may specify display characteristics of received input, or may enforce any other rules while or after the user provides input into the text field. In some instances, the techniques transitions between user input modes before the user submits the text string entered within the field. That is, the techniques may transition between modes as the user types within the text field.

In the illustrated embodiment, the techniques are described in the context of a user 102 operating a computing device 104 to access a content provider 106 over a network 108. For instance, user 102 may use device 104 to access provider 106 for purposes of consuming content offered by content provider 106 or engaging in any other sort of transaction with the content provider. In addition, when user 102 navigates to content provider 106 for the purpose of requesting and receiving content, another content provider 110 may also provide content to computing device 104 of user 102, as described in detail below. Specifically, content provider 110 may provide a text field and functionality capable of providing multiple different user input modes while user 102 provides an input within the text field.

In architecture 100, content provider 106 may comprise any sort of provider that supports user interaction, such as social networking sites, e-commerce sites, informational sites, news and entertainment sites, and so forth. Furthermore, while the illustrated example represents user 102 accessing content provider 106 over network 108, the described techniques may equally apply in instances where user 102 interacts with the content provider over the phone, via a kiosk, or in any other manner. It is also noted that the described techniques may apply in other client/server arrangements, as well as in non-client/server arrangements.

Here, user 102 accesses content provider 106 via network 108. Network 108 may include any one or combination of multiple different types of networks, such as cable networks, the Internet, and wireless networks. User computing device 104, meanwhile, may be implemented as any number of computing devices, including as a personal computer, a laptop computer, a portable digital assistant (PDA), a mobile phone, a set-top box, a game console, a personal media player (PMP), and so forth. User computing device 104 is equipped with one or more processors 112 and memory 114 to store applications and data. An application 116, such as a browser or other client application, running on device 104 may facilitate access to provider 106 over network 108.

As illustrated, content provider 106 may be hosted on one or more servers having one or more processors 118 and memory 120. In one implementation, the servers might be arranged in a cluster or as a server farm, although other server architectures may also be used. The content provider is capable of handling requests from many users and serving, in response, various content that can be rendered at user computing devices, such as user computing device 104 for consumption by user 102.

As illustrated, content provider 106 stores in memory 120 or otherwise has access to a database 122. Database 122 includes one or more pieces of content 124(1), 124(2), ..., 124(N). This content 124(1)-(N) may comprise anything that the content provider wishes to offer for purchase, rental, subscription, viewing, informative purposes, or some other form of consumption. In the illustrated example, the content 124(N) comprises information about a pair of running shoes that content provider 106 offers for consumption. Content provider 106 may serve this content 124(N) to device 104 of user 102 in response to receiving a request from user 102.

Architecture 100 also includes content provider 110, which includes one or more processors 126 and memory 128. Memory 128 may store or otherwise have access to a database 130, a widget-serving tool 132 and, potentially, functionality 134. As illustrated, database 130 includes one or more user identifiers 136(1), 136(2), ..., 136(M), each of which may be associated with a corresponding PIN 138(1), 138(2), ..., 138(M).

User identifiers 136(1)-(M) may comprise any identifier that uniquely associates a user with a corresponding user account. An example user identifier may comprise any collection of alphanumeric characters, such as a user name, an email address, a telephone number, or any other identifier. In the illustrated example, user identifiers 136(1)-(M) may be associated with one or more aspects of respective user accounts, such as a payment instrument. As such, users may use their associated identifiers to consume (e.g., purchase, rent, lease) content offered by consumption by content provider 106 and/or any other content provider. In some instances, user identifiers 136(1)-(M) comprise phrases consisting of letters, as described in U.S. patent application Ser. No. 11/548,111, incorporated by reference above. A PIN 138(M), meanwhile, may similarly comprise any collection of alphanumeric characters that functions to validate a user who provides a corresponding user identifier 136(M). In some instances, a PIN comprises a series of numerals.

Widget-serving tool 132, meanwhile, functions to serve a widget 140 for insertion into a piece of content served by content provider 106 and/or another content provider. As illustrated, widget 140 includes a text field 142 in which a user may provide both a user identifier of the user as well as a PIN associated with the user identifier for the purpose of consuming (e.g., purchasing, renting, etc.) a piece of content offered by content provider 106. Functionality 134, meanwhile, operates to provide multiple different user input modes for enabling user 102 to insert both a user identifier and a PIN into single text field 142. As discussed in detail below, functionality 134 may enable user 102 to type in user identifier 136(M) in the clear while masking PIN 138(M) while the user types this sensitive and confidential piece of information within text field 142.

In the illustrated example, when user 102 requests content 124(N) from content provider 106, computing device 104 of user 102 may receive a user interface (UI) 144 including content 124(N) from content provider 106 as well as widget 140 from content provider 110. In addition, UI 144 may include functionality 134, or functionality 134 may instead remain resident and operate upon content provider 110.

As illustrated, client application 116 may render UI 144 on computing device 104. By doing so, client application 116 allows user 102 to request to consume the illustrated content (here, to purchase the running shoes) by entering a valid user identifier 136(M) and PIN 138(M) into text field 142 of widget 140.

While user 102 provides this text into text field 142, however, functionality 134 may provide a first user input mode while user 102 provides identifier 136(M) and a second user input mode while user 102 provides PIN 138(M). To do so, functionality 134 may enforce a set of rules associated with the first mode and another different set of rules associated with the second mode.

As illustrated, functionality 134 includes a user-input mode module 146, an input-restriction module 148 and an input-display module 150. User-input mode module 146 functions to determine which user input mode applies at a current point in time while user 102 enters text into text field 142. For instance, in the illustrated example, module 146 provides a first user input mode while user 102 enters user identifier 136(M) before transitioning to a second user input mode when user 102 begins entering PIN 138(M).

Input-restriction module 148, meanwhile, functions to restrict characters that user 102 may enter into text field 142. In some instances, a particular user input mode may specify a set of characters that a user may enter when module 146 provides that particular user input mode. In the illustrated example, the first user input mode specifies that user 102 may enter letters but not numerals when entering identifier 136(M) in text field 142. The second user input mode, however, may specify that user 102 may enter numerals but not letters into text field 142. As such, input-restriction module 148 may enforce these specified restrictions for the respective modes. If, for instance, user 102 attempts to type a numeral into text field 142 while module 146 provides the first user input mode, input-restriction module 148 may prevent that input from being entered into text field 142 and/or may provide feedback to the user indicating that only text is allowed within the first user input mode.

Finally, input-display module 150 functions to enforce display characteristics for input provided by user 102 during a particular user input mode. For instance, the first user input mode may specify that input-display module 150 should display the text entered by user 102 while module 146 provides the first user input mode. The second user input mode, meanwhile, may specify that input-display module 150 should mask the display of the text entered by user 102 while module 146 provides the second user input mode. As such, input-display module 150 may cause display of identifier 136(M) (entered during the first user input mode) while masking display of PIN 138(M) (entered during the second user input mode).

In the illustrated example, user 102 has entered an identifier comprising a phrase "Marvelous Map". As illustrated, input-display module 150 has correspondingly displayed this identifier 136(M) entered during the first user input mode. However, after module 146 transitioned to the second user input mode during entry of PIN 138(M), input-display module refrained from displaying the four-digit PIN number and instead displayed the following: "**". As such, module 150 did indeed mask the input provided by user 102** during the second user input mode.

FIG. 1 also illustrates that client application 116 (e.g., a browser or the like) includes a visible field 152 and a hidden field 154. During entry of text by user 102 during the first user input mode, input-display module 150 stores this text within visible field 152. As such, this text ("Marvelous Map") appears within text field 142. However, during entry of text by user 102 during the second user input mode, input-display module 150 stores this text within hidden field 154. As such, this text does not appear within text field 142. Instead, input-display module 150 displays the asterisks or any other characters that mask the input.

However, when user 102 chooses to submit that entered identifier 136(M) and PIN 138(M), both the contents from visible field 152 and hidden field 154 may be provided to content provider 110. Content provider 110 may then determine the validity of the received combination of the identifier and the PIN and may accordingly approve or deny the request to consume the illustrated content. For instance, if the entered PIN 138(M) matches a PIN stored by content provider 110 in association with the entered identifier 136(M), then content provider 110 may approve the purchase of the illustrated shoes, assuming that the rules associated with identifier 136 allow for the purchase.

As this example illustrates, the techniques described herein allow a user to enter multiple different pieces of information into a single text field. Further, because each piece of information may be entered during a unique user input mode, the techniques may enforce certain rules associated with each unique user input mode. These rules may specify a set of characters that a text field will accept during the unique user input mode, may specify display characteristics to apply to text entered during the unique user input mode and/or may specify any other types of similar or different rules. While FIG. 1 illustrates one example of how the techniques may utilize a single text field for entry of multiple different types of user input modes, these techniques may apply in multiple other contexts. The following section provides, in greater detail, a few illustrative and non-limiting examples.

Illustrative User Interfaces

Having described an example architecture that may utilize the described techniques with reference to FIG. 1, FIGS. 2-4 illustrate example user interfaces (UIs) that may similarly employ these techniques.

Figure 2:
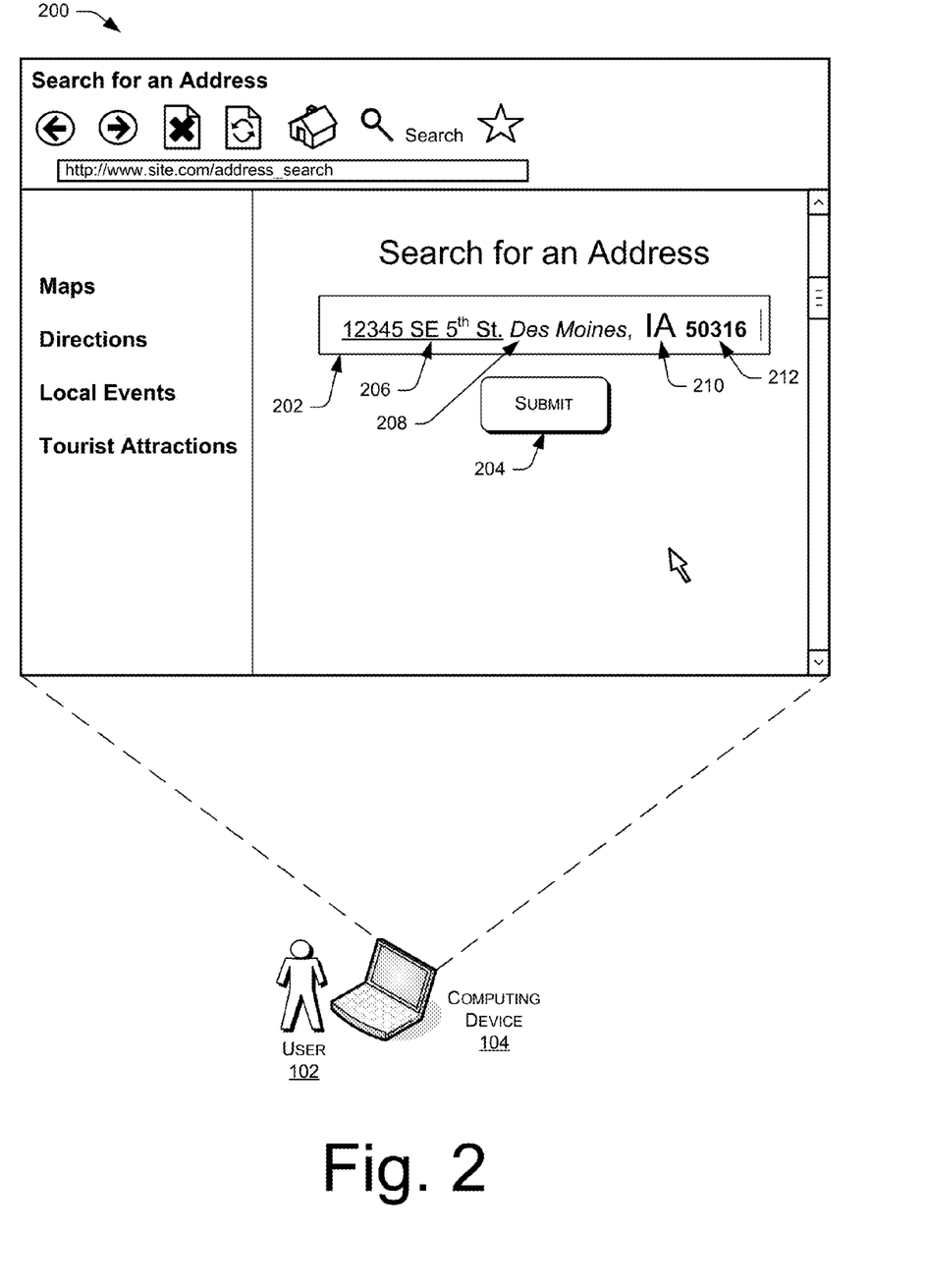
FIG. 2 illustrates an example user interface (UI) served by a content provider. As illustrated, the example UI enables entry of multiple different pieces of information in a single text field. The UI may also alter a display of the entered text based at least in part on the user input mode associated with each piece of entered information.

FIG. 2 illustrates an example UI 200 served by a content provider, such as content provider 106 or any other content provider. Here, example UI 200 comprises a search page that allows user 102 to search for an address of a residence, business or any other entity. As illustrated, UI 200 includes a text field 202 in which user 102 may provide an input comprising one or more characters (e.g., letters, numerals, symbols, etc.).

User interface 200 also includes an icon 204 entitled "Submit" that, when selected submits the entered input to a content provider for executing the search and providing search results to device 104 of user 102.

In addition, UI 200 may include functionality 134 or this functionality may reside on the content provider that serves the UI, as discussed above with reference to FIG. 1. In either instance, UI 200 may provide multiple different user input modes as user 102 enters input into text field 202. As discussed above, these different user input modes may restrict entry to a specified set of characters and/or may specify display characteristics associated with a received input. Here, functionality 134 alters a display of the text that user 102 enters within text field 202 when functionality 134 determines which user input mode to provide. For instance, if functionality 134 determines that user 102 has entered a valid city name, then functionality 134 may provide (retroactively) a corresponding user input mode. This mode may alter a display of the text, may validate whether or not the user has entered a proper city or may take any other action. In some instances, the user-input mode may alter a display of the text by altering one or more font characteristics of the text. For instance, the mode may change a size of the text, italicize the text, bold the text, underline the text, highlight the text, capitalize the text, change an actual font of the text or may otherwise change any display aspect of the entered text.

When the content provider serves functionality 134 as a part of UI 200, this functionality may take the form of client-side script or the like. When functionality 134 resides on the content provider, meanwhile, the techniques may make calls back to content provider to, for example, validate whether the entered text comprises a valid city or the like. In some instances, these techniques may utilize asynchronous JavaScript+XML ("AJAX") or similar technology to execute these calls back to the content provider.

As illustrated, user 102 may enter (e.g., type) an input into text field 202 comprising a collection of letters and numerals that is intended to specify an address. This address may comprise a street name, a street number, a city, a state, a zip code, a country or any other geographical indications. A first portion 206 of the input comprises a collection of numerals ("12345") followed by two letters ("SE") as well as a number ("5$^{th}$") and two more letters ("St."). After user 102 enters this portion 206 of the input into text field 202 and before user 102 submits this input to the content provider, functionality 134 may determine that user 102 intends portion 206 to comprise a street name and number portion of the address. That is, functionality 134 may determine any set of numerals followed by text specifying a direction (e.g., "SE," "N.E.," "E," "South," etc.) as well as a type of road (e.g., "St.," "Road," "Ave.," etc.) comprises a street name and number portion of an address.

Upon making this determination after user 102 has entered this text, functionality 134 (and, more specifically, input-display module 150) may alter a manner in which UI 200 displays this text. Here, for instance, UI underlines the street name and number "12345 SE 5$^{th}$ St." This alteration as well as each described alteration herein, however, is merely illustrative and the techniques may alter the text in any other similar or different manner.

In addition, as user 102 continues typing or otherwise entering text within text field 202, functionality 134 continues to determine what type of input the user currently provides and, thus, which of the multiple user input modes to provide. As illustrated, user 102 next enters a portion 208 of the input comprising the text "Des Moines." In response, functionality 134 may determine that this text matches the name of a valid city and, as such, functionality 134 may provide a corresponding user input mode. Here, this user input mode specifies that text associated with a city should be italicized. As such, input-display module 150 italicizes the city name "Des Moines."

Next, user 102 enters a portion 210 of the input comprising the text "IA." Again, functionality 134 may determine that "IA" comprises a valid abbreviation for the state of Iowa. As such, functionality 134 may retroactively alter this text to ensure that these letters are capitalized and to increase a font size of the letters. Finally, user 102 then enters a portion 212 of the input comprising a five digit collection of numerals ("50316"). In response, functionality 134 may determine that this collection of numerals comprises a valid zip code and, as such, the input-display module 150 may bold these numerals. In addition, in instances where functionality 134 determines that the user is inputting a zip code while the user inputs the zip code, functionality 134 may restrict entry within the text field to numbers and, potentially, to entry of only some number of characters (e.g., five) corresponding to the length of a zip code.

By altering the display of entered text, the described techniques help user 102 to visually see that his or her entered text corresponds to valid portions of the street address while entering an input in a single text field. In addition or in the alternative, if functionality 134 determines that user 102 enters an invalid portion of input (e.g., an invalid city), input-display module 150 may refrain from altering the text in the illustrated manner or may provide an error message or the like. As such, functionality 134 may further assist the user in determining whether or not he or she is providing a valid address, all while allowing the user to provide the input within single text field 202 and before the user submits the input via selection of icon 204.

In addition, the described techniques may alter a display of text based on subsequently inputted text. For instance, if a user enters a string of text followed by a valid state identifier (e.g., "IA"), then the described techniques may determine that that the immediately preceding string of text likely comprises a city name. As such, the techniques may, at that point, provide the user input mode associated with entry of a city name. For instance, if this user input mode specifies italicizing of a city name, then the described techniques may italicize the string of text comprising the city name at this point.

Figure 3:
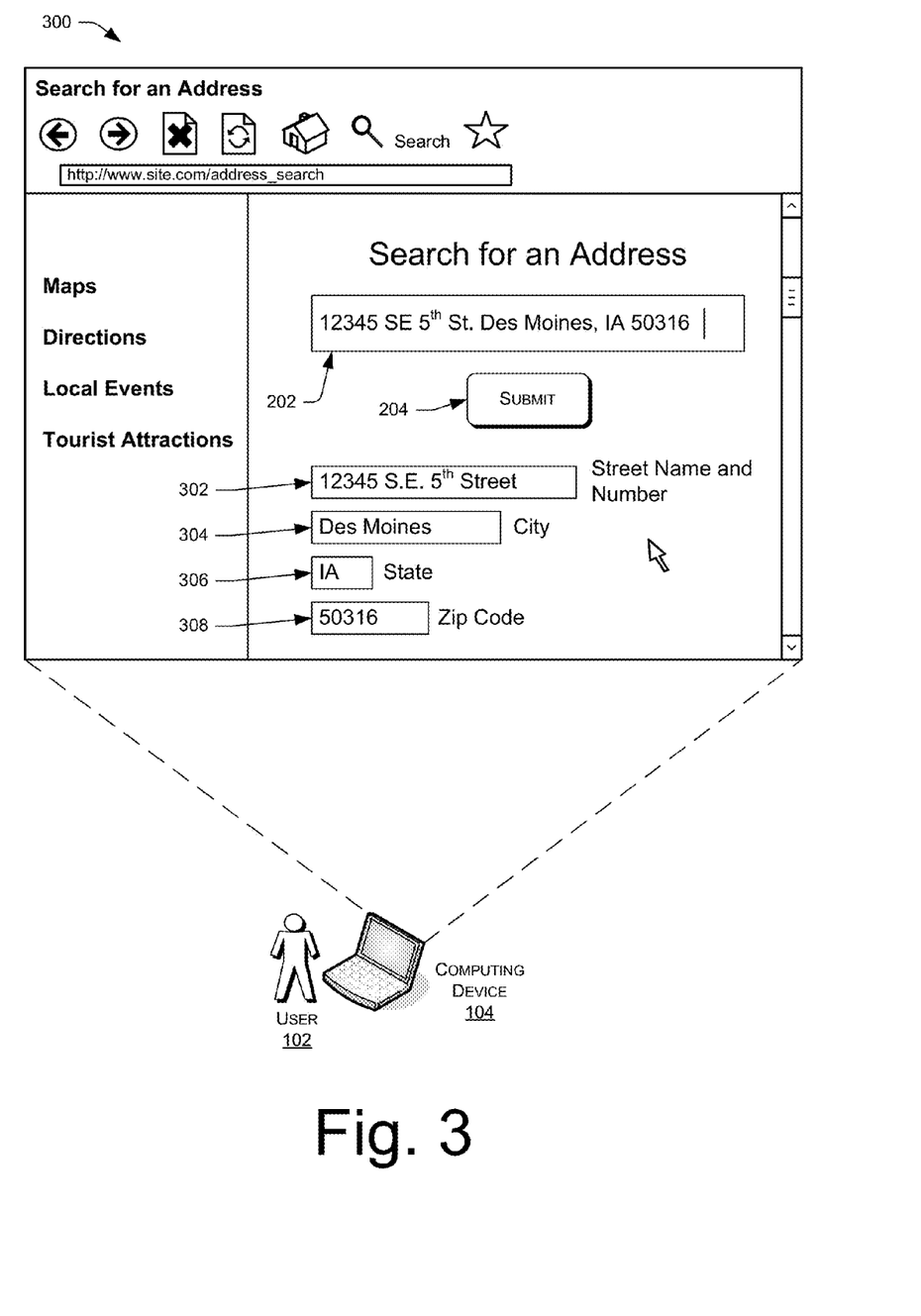
FIG. 3 illustrates another example UI served by a content provider. As illustrated, the example UI again enables entry of multiple different pieces of information in a single text field and again alters a display of the entered text based at least in part on the user input mode associated with each piece of entered information. Here, the UI causes the entered information to appear in a location other than the text field in which the user entered the information.

FIG. 3 illustrates another example UI 300 that may implement the described techniques. As illustrated, UI 300 includes text field 202 in which user 102 may provide an input, icon 204, as well as one or more other text fields 302, 304, 306 and 308. As described below, UI 300 may alter a display of the user's input by copying portions of the input provided in text field 202 into corresponding text fields 302-308 that are separate from text field 202 as user 102 types. In addition, UI 300 may alter the actual inputted text as discussed below.

To illustrate, user 102 may begin providing an input into text field 202 by first typing the text "12345 SE 5$^{th}$ St." As discussed above, after entry of this text and before the user selects icon 204, functionality 134 may determine that user 102 has provided a street name and number within text field 202. Upon making this determination, functionality 134 may copy this street name and number from text field 202 and cause display of this text within text field 302, entitled "Street Name and Number." Note that functionality 134 may also change the display by changing portions of the entered text. For instance and as illustrated, while user 102 has entered "SE" and "St." within text field 202, functionality 134 has caused display of "S.E." and "Street," respectively, within text field 302.

Additionally, user 102 may continue to type and may next provide the text of "Des Moines." After user 102 enters this text, functionality 134 may determine that this text comprises the name of a valid city. As such, input-display module 150 may cause display of this text within text field 304, corresponding to a city name. Similarly, functionality 134 may determine that "IA" comprises a valid representation of Iowa and, as such, may provide this text within text field 306. Finally, when user 102 enters the zip code "50316," input-display module 150 may cause display of this text within text field 308.

FIG. 3 thus illustrates another example user interface where user 102 may provide multiple different pieces of information within a single text field while receiving confirmation of the validity of the user's input. Here, for example, user 102 receives confirmation that the user has indeed entered a valid street name and number, city, state and zip code. As such, user 102 may select submit icon 204 knowing that the content provider will understand the user's search request.

Figure 4:
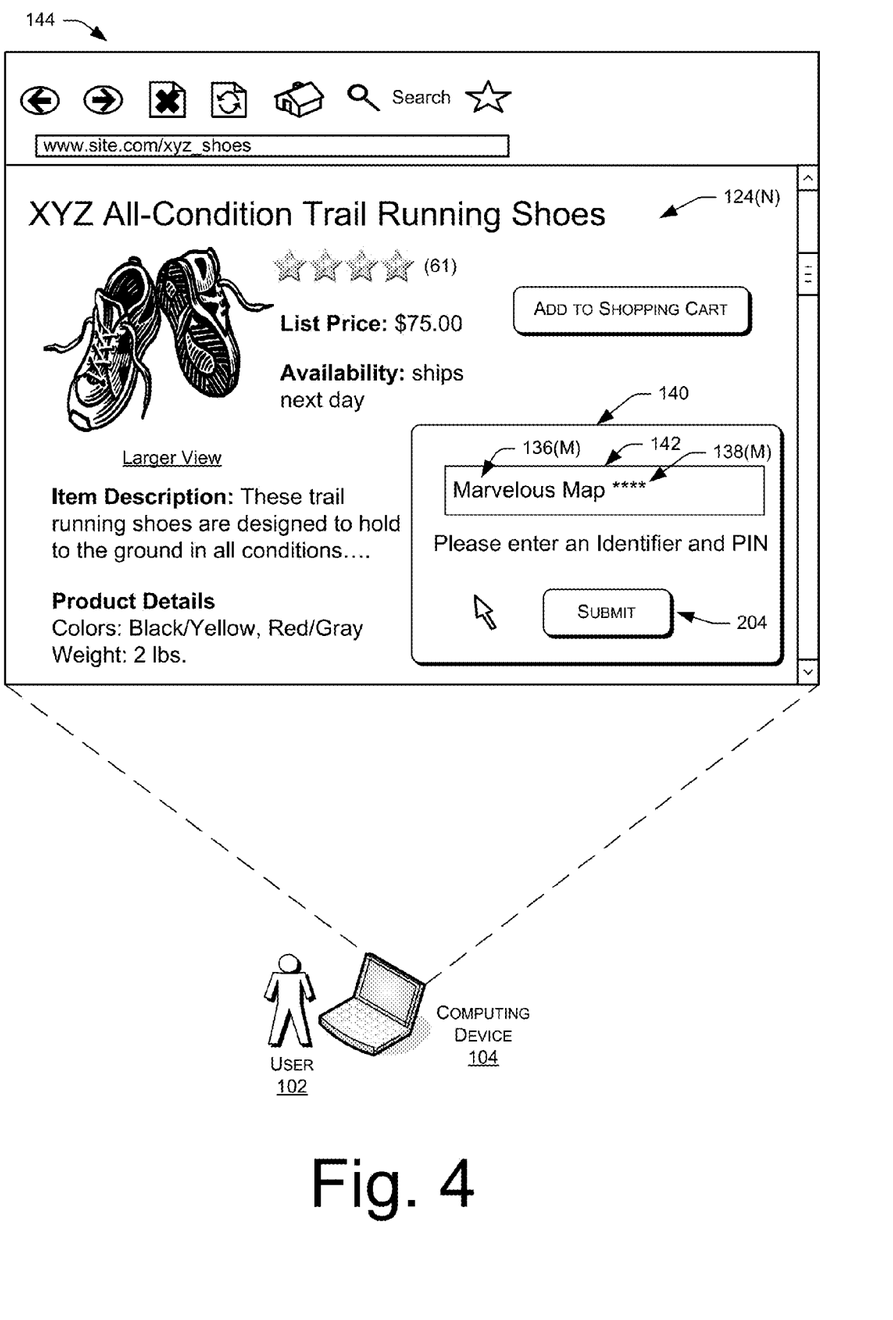
FIG. 4 illustrates yet another example UI served by a content provider. Here, the UI includes a widget that includes a single text field for entering multiple different pieces of information. The UI allows a user to enter an identifier in a first user input mode and a password associated with the identifier in a second user input mode. As illustrated, the UI displays the identifier while masking the password.

FIG. 4 illustrates UI 144 from FIG. 1 in greater detail. As discussed above with reference to FIG. 1, UI 144 includes content 124(N) from content provider 106 as well as widget 140 from content provider 110. As illustrated, widget 140 includes text field 142 that allows user 102 to insert an identifier 136(M) associated with the user as well as a password or PIN 138(M) associated with the identifier. Upon entering this information, user 102 may select icon 204 to request to purchase the illustrated pair of running shoes from content provider 106.

In some instances, the entered identifier 136(M) may comprise a transaction phrase token comprising two or more grammatically correct words, as described in U.S. Provisional Application No. 60/823,611 and U.S. patent application Ser. No. 11/548,111, both incorporated by reference above. In these instances, user 102 may use the associated phrase (e.g., "Marvelous Map") as a proxy for the associated or linked payment instrument. For example, this phrase may link with a payment instrument (e.g., a credit card, debit card, gift card, bank account, etc.) of user 102 or some other person or entity. Therefore, user 102 (and potentially one or more other users) may employ this phrase as a payment method for future purchases or other types of transactions. Additionally, user 102 (or some other user) may choose to associate certain rules to the selected phrase. These rules may, for instance, dictate when and how user 102 (and, potentially, other users) may use the phrase for purchases or otherwise.

Some rules may dictate which user actually controls the phrase (e.g., the person associated with the underlying payment instrument, such as the credit card holder). For instance, a mother may create a phrase for her daughter ("Grace") entitled "Grace's Textbooks". Once the mother creates or approves creation of the phrase, Grace may then specify this phrase as a payment method. By identifying this phrase as a payment method, the daughter thus identifies the mother (i.e., the person associated with the linked payment instrument) as the payer for these purchases.

Again, this phrase may be associated with predefined rules. For instance, the mother may create a rule that pre-approves purchases of certain categories of items, such as textbooks. The mother may also employ other rules, such as dollar amounts, time limits, and the like. In these instances, when the daughter uses the phrase as a payment method, the content provider 106 may compare the parameters of the requested purchase with the rules associated with the phrase. The service may then complete or cancel the requested purchase according to the phrase's rules. Conversely or additionally, content provider 106 may contact the user that controls use of the phrase (here, the mother) to request that he or she approve or deny the requested purchase. The user that controls the use of the phrase may, in some cases, be requested to authenticate themselves in some way, such as through a username and password in order to approve the transaction.

Returning to FIG. 4, UI 144 may also include functionality 134 to provide multiple user input modes, as illustrated and discussed above with reference to FIG. 1. Here, functionality 134 provides a first user input mode that allows user 102 to provide identifier 136(M) "in the clear." That is, this first user input mode allows user 102 to input the transaction phrase token "Marvelous Map" and have the entered phrase appear within text field 142. After entering this identifier, functionality 134 may transition to a second user input mode. As discussed above, this second user input mode may allow user 102 to enter a PIN 138(M) within text field 142 without having the PIN display within the text field. Instead, functionality 134 masks the entered PIN (with asterisks or otherwise) while still storing the value of the PIN within hidden field 154 of the browser or other client information. As such, when user 102 selects icon 204, both the visible identifier 136(M) and the masked PIN 138(M) may be provided to content provider 110 for verification and validation. For instance, content provider 110 may determine if the received PIN matches a PIN stored by the content provider in association with the transaction phrase token "Marvelous Map." If so, and if the rules associated with the transaction phrase token "Marvelous Map" allow for the purchase of the illustrated running shoes, then content provider 110 may process the requested transaction.

FIG. 4 thus illustrates yet another example user interface that may provide multiple different user input modes while a user provides text within a single text field. As illustrated, this UI visually displays a portion of a user's input while masking another, more sensitive and confidential portion of the input.

Example Flow Diagrams

Figure 5:
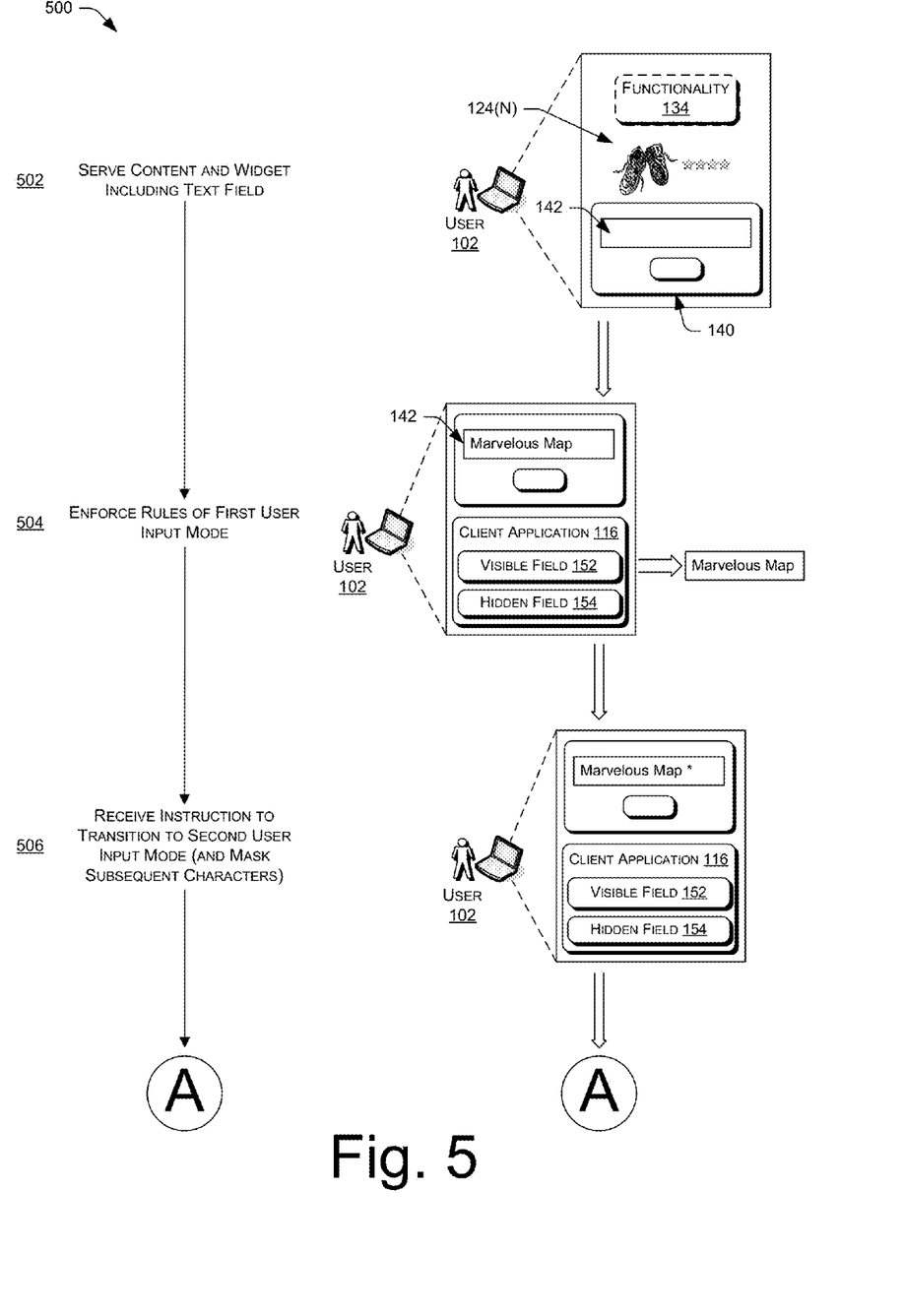
FIGS. 5-6 illustrate an example flow diagram for employing a single text field that enables entry of different pieces of information in respective different user input modes.
Figure 6:
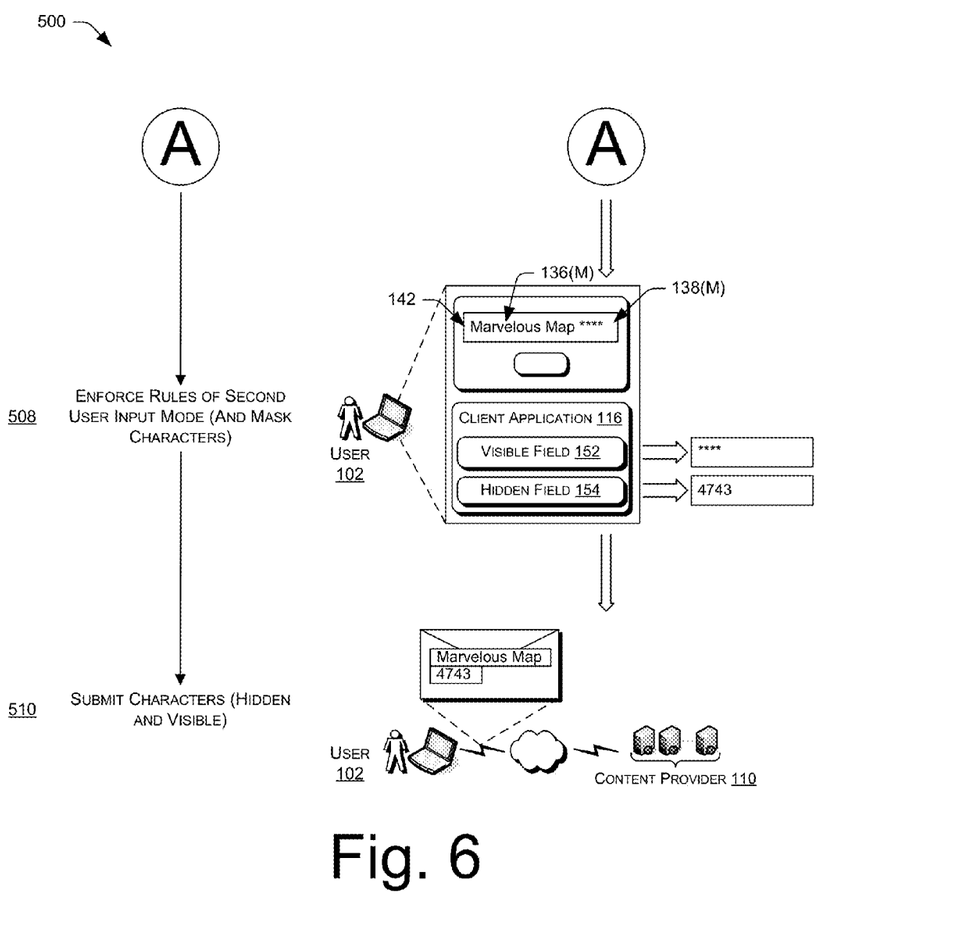

Having illustrated and described several example and non-limiting UIs, FIGS. 5-6 illustrate an example flow diagram of a process 500 for employing a single text field that enables entry of different pieces of information in respective different user input modes.

Process 500 includes serving, at operation 502, serving a user interface that includes content 124(N), widget 140 and, potentially, functionality 134. As illustrated, widget 140 may include text field 142 while functionality 134 may provide multiple different user input modes while user 102 enters text into text field 142. Next, operation 504 enforces the rules of the first user input mode. In the instant example, the first user input mode may restrict entry of characters to letters and use of a space bar of device 104. Of course, in other implementations the first user input mode may restrict the entry of characters to numerals, symbols, or any combination thereof. In the instant example, the rules of the first user input mode may also specify that the entered letter should be visibly displayed within text field 142. As such, the contents of the entered input (here, the identifier "Marvelous Map") may be stored within visible field 152 of client application 116.

Next, operation 506 represents receiving an instruction to transition to a second user input mode. As discussed in detail below with reference to FIG. 7, this instruction may comprise the user entering an input specifying a space followed by an input specifying a character of a set of characters associated with the second user input mode but not with a set of characters associated with the first user input mode. For instance, the second user input mode may restrict entry of text to numerals. As such, if user 102 provides a space followed by a numeral, functionality 134 may interpret this as an instruction to transition to the second user input mode at operation 506.

FIG. 6 continues the illustration of process 500. Here, functionality 134 enforces rules of the second user input mode at operation 508. As discussed above, these rules may restrict entry of text within text field 142 to numerals and may also specify that the contents of the entered text should be masked. As such, FIG. 6 illustrates that the contents of the entered PIN of ("4743") may be stored in hidden field 154 of client application 116, while asterisks or other masking characters (e.g., #, $, @, etc.) are stored in visible field 152. As such, client application 116 stores the actual contents of the entered PIN while also masking these contents so as to protect the secrecy of the entered PIN.

Finally, operation 510 represents that user 102 may choose to submit the entered text comprising the identifier and the PIN. Here, client application 116 sends both the visible characters ("Marvelous Map") as well as the hidden or masked characters ("4743") to content provider 110 for validation.

Figure 7:
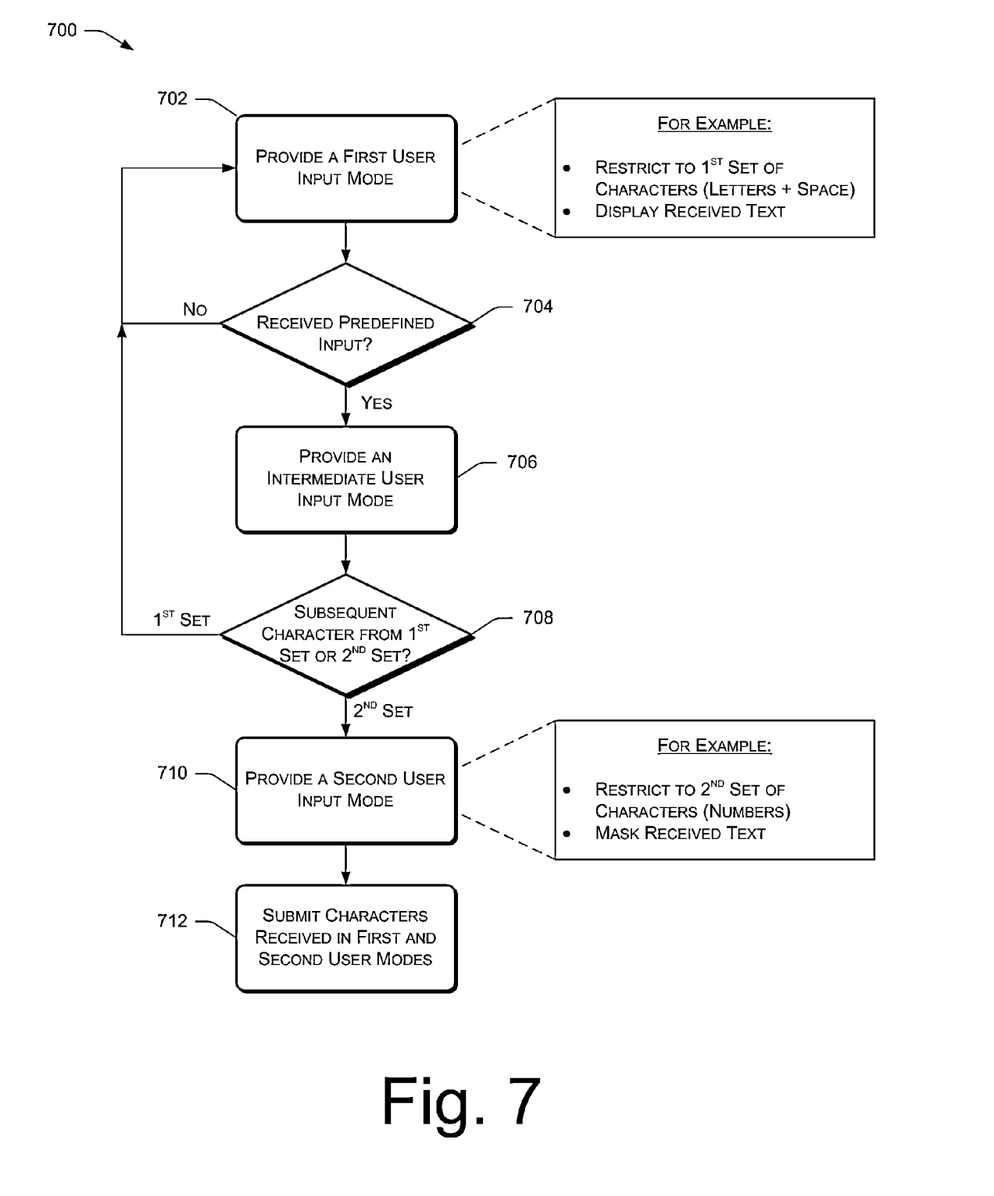
FIG. 7 illustrates an example process for providing a single text field that enables multiple different user input modes. These modes may include a mode that displays text received from a user as well as a mode that masks text received from a user.

While FIGS. 5-6 illustrate a flow diagram of process 500 in which user 102 provides a visible identifier 136(M) and a hidden PIN 138(M), FIG. 7 illustrates a process 700 that functionality 134 may implement in order to provide the multiple different user input modes described in process 500.

Process 700 includes, at operation 702, providing a first user input mode to allow a user to enter text into a text field according to rules associated with this first user input mode. Here, functionality 134 may provide this first user input mode before user 102 begins typing within the text field. In one example and as illustrated, the first user input mode may restrict entry of text within the text field to a first set of characters comprising letters and use of the user's space bar. Therefore, if user 102 provides a numeral while functionality 134 provides the first user input mode, functionality 134 may refrain from entering this numeral within the text field. Next, during each input received from user 102, process 700 may query whether the received input comprises a certain predefined input at operation 704. In one example, the predefined input comprises a selection by the user of a space bar of the user's device 104 or any other input that requests entry of a space within the text field.

If the predefined input is not received, the process 700 continues to provide the first user input mode at operation 702. If, however, the predefined input (e.g., the space) is received, then process 700 includes an intermediate user input mode at operation 706. In this intermediate user input mode, user 102 may provide a character from either the first set of characters associated with the first user input mode (e.g., a letter), or user 102 may provide a character from a second set of characters associated with a second user input mode (e.g., a numeral, as discussed below). In this example, the first set of characters (letters) and the second set of characters (numerals) are mutually exclusive.

As such, operation 708 queries whether a character received subsequent to the predefined input comprises a character from the first set of characters or a character from the second set of characters. If this subsequently received character is from the first set of characters, then process 700 returns to operation 702 and the providing of the first user input mode. If, however, this subsequently received character is from the second set of characters, then process 700 proceeds to provide a second user input mode at operation 710. In one example and as illustrated, this second user input mode restricts entry within the text field to numerals and, further, masks the numerals received from user 102. As such, when user 102 enters a PIN in the second user mode, the contents of the PIN are not displayed.

Finally, after user 102 provides an input within the text field while in the second user mode, user 102 may submit the inputs provided in both the first and second user modes at operation 712. For instance, user 102 may submit the identifier entered in the first user mode as well as the PIN entered in the second user mode. In some instances, user 102 may submit these inputs to content provider 110 as illustrated and described in FIGS. 1 and 5-6. Again, content provider 110 may then complete or decline the requested transaction based on the received identifier and PIN, amongst other factors.

Illustrative Processes

FIGS. 8-11 illustrate example processes 800, 900, 1000 and 1100 for implementing the techniques described above. While these processes are described with reference to the architectures discussed above, the described techniques may be equally applicable in many other architectures and environments. Furthermore, the described processes (as well as each process described throughout this document) can be implemented in hardware, software, or a combination thereof. In the context of software, the illustrated operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 8:
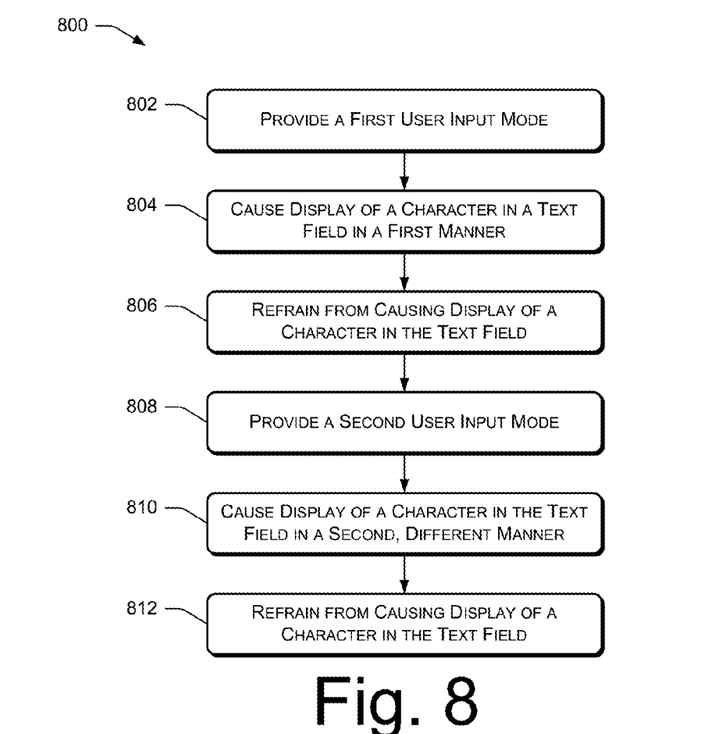
FIGS. 8-11 illustrate example processes for employing the techniques described below.

Process 800 includes operation 802, which represents providing a first user input mode that restricts display of an input into a text field to a first set of characters. Next, operation 804 may cause display of a character within the text field in a first manner at least partly in response to receiving an input from a user specifying a character of the first set of characters. Operation 806, meanwhile, refrains from causing display of a character within the text field at least partly in response to receiving an input from the user specifying a character that the first set of characters does not include.

Next, operation 808 provides a second user input mode that restricts display of an input into the text field to a second set of characters that differs from the first set of characters. At this point, operation 810 causes display of a character within the text field in a second manner that differs from the first manner at least partly in response to receiving an input from the user specifying a character of the second set of characters. Finally, operation 812 refrains from causing display of a character within the text field at least partly in response to receiving an input from the user specifying a character that the second set of characters does not include.

Figure 9:
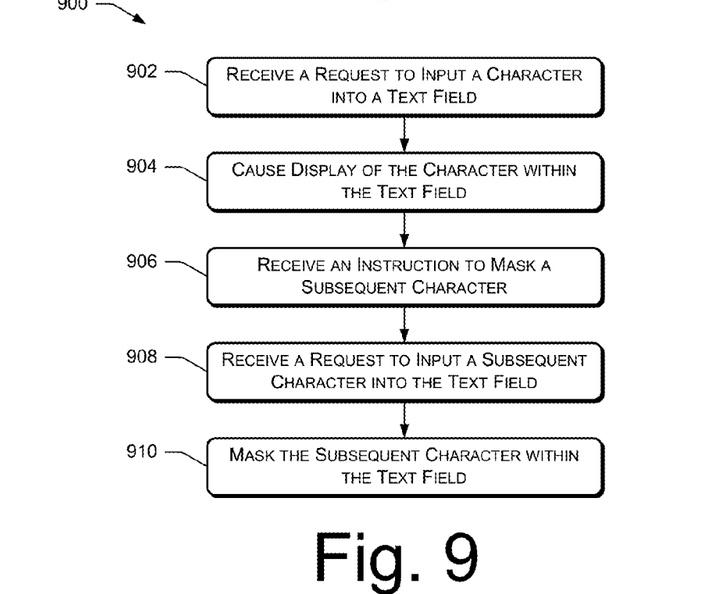

FIG. 9, meanwhile, illustrates process 900. Process 900 includes receiving a request to input a character into a text field at operation 902. Next, operation 904 causes display of the character within the text field at least partly in response to the receiving of the request. Operation 906 then represents receiving an instruction to mask a subsequent character requested to be input into the text field. Operation 908, meanwhile, receives a request to input a subsequent character into the text field and, at least partly in response to the receiving of the request to input the subsequent character, operation 910 masks the subsequent character within the text field.

Figure 10:
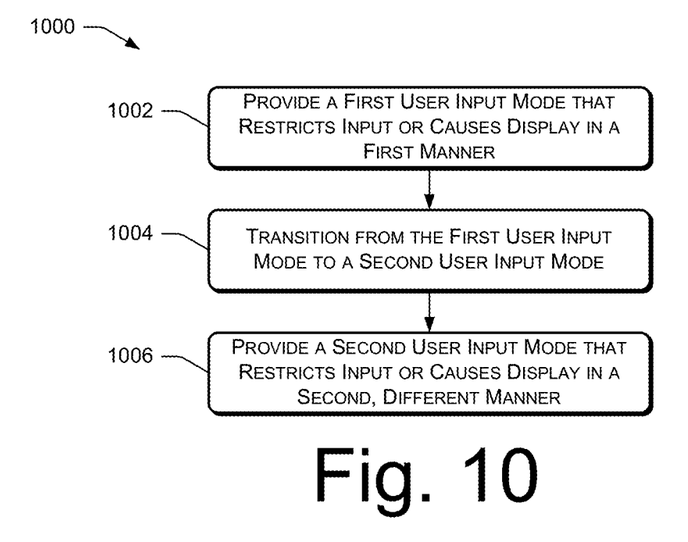

FIG. 10 illustrates yet another process 1000 for implementing the described techniques. This process includes, at operation 1002, providing a first user input mode that restricts an input in a text field to a first specified set of characters or that causes display of an input in the text field in a first specified manner. Next, and before submittal by a user of an input provided in the text field, operation 1004 transitions from the first user input mode to a second user input mode. Finally, operation 1006 provides the second user input mode, with the second user input mode restricting an input in the text field to a second specified set of characters that differs from the first specified set or causing display of an input in the text field in a second specified manner that differs from the first specified manner.

Figure 11:
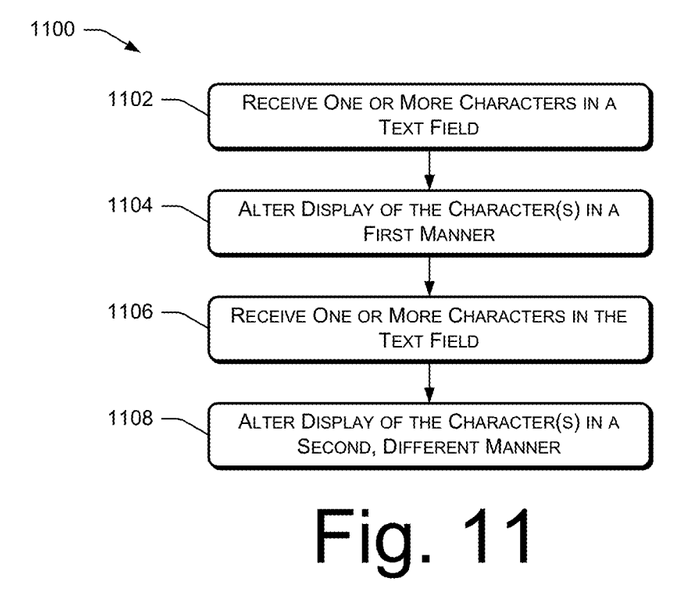

Finally, FIG. 11 illustrates a process 1100. At operation 1102, this process receives, in a text field and from a user, a first input comprising one or more characters. Next, and at least partly in response to the receiving of the first input, operation 1104 alters display of the one or more characters of the first input in a first manner before submittal by the user of the one or characters of the first input in the text field. Operation 1106 then receives, in the text field and from the user, a second input comprising one or more characters. Finally, and at least partly in response to the receiving of the second input, operation 1108 alters display of the one or more characters of the second input before submittal by the user of the one or characters of the second input in the text field and in a second manner that differs from the first manner.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable media storing computer-executable instructions that, when executed, cause one or more processors to perform acts comprising:
 providing a first input mode that restricts display of an input into a text field to a first set of characters;
 causing display of one or more characters of the first set of characters within the text field in a first manner;
 providing a second input mode that restricts display of an input into the text field to a second set of characters that differs from the first set of characters; and
 causing display of one or more characters of the second set of characters within the text field in a second manner that differs from the first manner.

2. One or more computer-readable media as recited in claim 1, wherein the first manner comprises one of displaying a character or masking a character, and the second manner comprises an other of displaying the character or masking the character.

3. One or more computer-readable media as recited in claim 1, wherein the first set of characters and the second set of characters comprise mutually exclusive sets of characters.

4. One or more computer-readable media as recited in claim 1, wherein the first set of characters and the second set of characters comprise at least one common character.

5. One or more computer-readable media as recited in claim 1, wherein the first set of characters comprises one of letters or numerals and the second set of characters comprises an other of letters or numerals.

6. One or more computer-readable media as recited in claim 1, further comprising transitioning from the first input mode to the second input mode in response to causing display of the one or more characters of the first set of characters within the text field in the first manner.

7. One or more computer-readable media as recited in claim 1, wherein the first set of characters and the second set of characters comprise mutually exclusive sets of characters, and wherein the acts further comprise:
receiving an input specifying a predefined character;
receiving an input specifying a character subsequent to the received predefined character;
at least partly in response to determining that the character subsequent to the received predefined character comprises a character of the first set of characters, providing the first input mode; and
at least partly in response to determining that the character subsequent to the received predefined character comprises a character of the second set of characters, providing the second input mode.

8. A method comprising:
under control of one or more computer systems configured with executable instructions,
while in a first input mode that restricts display of an input to a first set of characters, causing, via one or more computing devices, display of one or more characters of the first set of characters in a first manner; and
while in a second input mode that restricts display of an input to a second set of characters that differs from the first set of characters, causing, via one or more computing devices, display of one or more characters of the second set of characters in a second manner that differs from the first manner.

9. The method as recited in claim 8, wherein the first manner comprises one of displaying a character or masking a character, and the second manner comprises an other of displaying the character or masking the character.

10. The method as recited in claim 8, wherein the first set of characters and the second set of characters comprise mutually exclusive sets of characters.

11. The method as recited in claim 8, wherein the first set of characters and the second set of characters comprise at least one common character.

12. The method as recited in claim 8, wherein the first set of characters comprises one of letters or numerals and the second set of characters comprises an other of letters or numerals.

13. The method as recited in claim 8, further comprising transitioning from the first input mode to the second input mode in response to causing display of the one or more characters of the first set of characters within the text field in the first manner.

14. The method as recited in claim 8, wherein the first set of characters and the second set of characters comprise mutually exclusive sets of characters, and wherein the acts further comprise:
receiving an input specifying a predefined character;
receiving an input specifying a character subsequent to the received predefined character;
at least partly in response to determining that the character subsequent to the received predefined character comprises a character of the first set of characters, providing the first input mode; and
at least partly in response to determining that the character subsequent to the received predefined character comprises a character of the second set of characters, providing the second input mode.

15. A system comprising:
one or more processors;
memory; and
one or more modules stored in the memory and executable by the one or more processors to:
while in a first input mode that restricts display of an input to a first set of characters, cause display of one or more characters of the first set of characters in a first manner; and
while in a second input mode that restricts display of an input to a second set of characters that differs from the first set of characters, cause display of one or more characters of the second set of characters in a second manner that differs from the first manner.

16. The system as recited in claim 15, wherein the first manner comprises one of displaying a character or masking a character, and the second manner comprises an other of displaying the character or masking the character.

17. The system as recited in claim 15, wherein the first set of characters and the second set of characters comprise mutually exclusive sets of characters.

18. The system as recited in claim 15, wherein the first set of characters and the second set of characters comprise at least one common character.

19. The system as recited in claim 15, wherein the one or more modules are further executable by the one or more processors to transition from the first input mode to the second input mode in response to causing display of the one or more characters of the first set of characters within the text field in the first manner.

20. The system as recited in claim 15, wherein the first set of characters and the second set of characters comprise mutually exclusive sets of characters, and wherein the plurality of instructions are further executable to:
receive an input specifying a predefined character;
receive an input specifying a character subsequent to the received predefined character;
at least partly in response to a determination that the character subsequent to the received predefined character comprises a character of the first set of characters, provide the first input mode; and
at least partly in response to a determination that the character subsequent to the received predefined character comprises a character of the second set of characters, provide the second input mode.

* * * * *